Nov. 18, 1958   G. F. CARLSON ET AL   2,860,659
FLOW CONTROL VALVE
Original Filed April 13, 1951

Inventors.
Gilbert F. Carlson.
Harold A. Lockhart.
By. [signature]
Attorney.

2,860,659

FLOW CONTROL VALVE

Gilbert F. Carlson, Skokie, and Harold A. Lockhart, Wauconda, Ill., assignors to Bell & Gossett Company, Morton Grove, Ill., a corporation of Illinois Original application April 13, 1951, Serial No. 220,948, now Patent No. 2,701,581, dated February 8, 1955. Divided and this application October 15, 1954, Serial No. 462,406

1 Claim. (Cl. 137—533.27)

Our invention relates to flow control valves which are pressure operated in an opening direction and is concerned more particularly with that type which is vertically reciprocable between open and closed positions.

A characteristic form of this valve includes a valve member slidably mounted for vertical movements on a stem, the member being raised in an opening direction by fluid pressure and gravity moved to closure when the pressure is removed. A typical application of the valve occurs in forcibly circulated, hot water heating systems wherein the valve opens in response to the operation of a thermostatically controlled pump to permit circulation through the radiating part of the system and closes when the pump stops, i. e., when the demand of the space being heated is satisfied. Sufficient clearance must be provided between the valve member and its stem to insure its free gravity movement to closure, but this condition sets up a chattering action when the pump starts and the noise thus created is transmitted through the associated piping and is objectionable, particularly in domestic installations.

It is therefore the principal object of the invention to provide a flow control valve in which the valve member is constructed in relation to the opening pressure so that the member is tilted or rocked into non-chattering contact with the valve stem during the opening movement of the member.

These and further objects of the invention will be set forth in the following specification, reference being had to the accompanying drawing, and the novel means by which said objects are effectuated will be definitely pointed out in the claim.

This application is a division of our copending application for Flow Control Valve, Ser. No. 220,948, filed April 13, 1951, now Patent No. 2,701,581.

Figure 1:
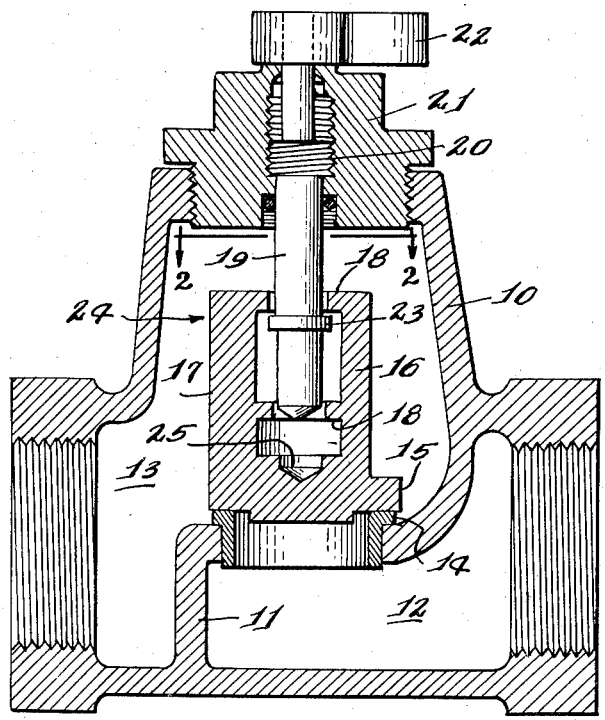
Fig. 1 is a sectional elevation of the valve with the valve member in closed position.
Figure 2:
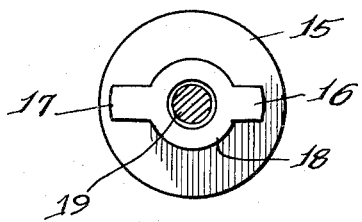
Fig. 2 is a plan view of the member taken on the line 2—2 of Fig. 1.

Referring to the drawing, the numeral 10 designates a hollow valve body which is divided interiorly by a wall 11 into inlet and outlet chambers 12 and 13, respectively. The wall 11 is apertured to receive a sleeve valve seat 14 whose axis is vertical and whose upper surface sealingly coacts with a valve disk 15 in the usual way. In effect, therefore, the valve seat 14 forms a part of the wall 11. Extending upwardly from the disk 15 are spaced, parallel legs 16 and 17 which are connected above the disk by vertically spaced, annular ribs 18—18 that are apertured for sliding engagement with the lower end of a vertical stem 19 whose vertical axis is aligned with the axis of the valve seat 14, the legs and ribs accordingly forming a skeleton structure for guidably mounting the disk 15 on the stem 19. The upper end of this stem includes an enlargement 20 threaded in a closure cap 21 demountably secured to the body 10 and the stem extends exteriorly of the cap 21 for attachment to a handle 22. Below the upper rib 18, the stem 19 is provided with an annular shoulder 23 which is spaced from the upper rib 18 when the disk 15 engages the seat 14.

When the handle 22 is rotated in the proper direction, the shoulder 23 will engage the upper rib 18 to manually open the valve disk 15, or with the parts in the positions shown in Fig. 1, the valve disk will move upwardly whenever an adequate pressure exists in the inlet chamber 12, such as when an associated pump starts operating, and will drop by gravity to a closing position when the pressure is removed. Under the latter condition, the valve member, generally designated by the numeral 24 and including the disk 15, legs 16 and 17, and ribs 18, is guided on the stem 19 whose lower end bottoms in a pocket 25 formed in the top side of the disk 15 when the latter is raised.

So far as described, the foregoing structure follows accepted practice in flow control valves, but it is characterized by a tendency of the valve member to chatter when an opening pressure is established in the chamber 12 and this chatter sets up a noisy condition which is transmitted through the associated piping. This noise is particularly objectionable in domestic hot water heating systems.

The sliding fit of the valve member 24 on the stem 19 is of the order of .020" to .032", it being necessary to insure that the member will move freely in both directions without too sloppy a fit. It is believed that this sliding clearance, though small, is the cause of this chatter which is eliminated by the following instrumentalities.

As shown, the leg 17 includes a greater mass than that of the leg 16 so that the center of gravity of the member 24 lies to the left of the axis of the stem 19. Assuming that the valve member 24 is closed, then when pressure is established in the inlet chamber 12, it operates uniformly against the exposed portion of the under side of the disk 15 and, due to the unbalanced construction of the member 24, this pressure tilts or rocks the member to the left and thus causes the upper and lower ribs 18, respectively, to bear oppositely against the stem 19. This snug holding of the member 24 against the stem 19 during the opening movement prevents chattering of the member on the stem.

We claim:

A flow control valve comprising a hollow body having an apertured interior wall including a valve seat and defining with the body inlet and outlet chambers, a vertical stem mounted within the body coaxial with the seat, a valve disk operably related to the seat and having an upwardly extending skeleton structure including a pair of opposed legs and a pair of vertically spaced, guide elements slidable freely along the stem, one of the legs having a greater mass than the other to thereby offset the center of gravity of the disk from the sliding axis thereof and the disk being moved upwardly in an opening direction by pressure in the inlet chamber, the pressure rocking the member so that the guide elements bear oppositely, respectively, against the stem.

References Cited in the file of this patent

UNITED STATES PATENTS

| | | |
|---|---|---|
| 362,326 | Smith | May 3, 1887 |
| 1,716,722 | Fausek | June 11, 1929 |
| 1,807,594 | Hopkins | June 2, 1931 |
| 2,701,581 | Carlson | Feb. 8, 1955 |

FOREIGN PATENTS

| | | |
|---|---|---|
| 8,383 | Great Britain | of 1908 |
| 847,296 | Germany | of 1952 |